(12) United States Patent
Biurrun Sotelo et al.

(10) Patent No.: US 9,590,416 B2
(45) Date of Patent: Mar. 7, 2017

(54) SAFETY DEVICE FOR A HIGH-VOLTAGE SYSTEM AND METHOD FOR SAFEGUARDING A HIGH-VOLTAGE SYSTEM

(71) Applicant: Robert Bosch GmbH, Stuttgart (DE)

(72) Inventors: Rodrigo Biurrun Sotelo, Aachen (DE); Juergen Binder, Filderstadt-Piattenhardt (DE); Ulrich Gottwick, Stuttgart (DE); Hans-Georg Horst, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 340 days.

(21) Appl. No.: 14/388,608

(22) PCT Filed: Feb. 14, 2013

(86) PCT No.: PCT/EP2013/052982
§ 371 (c)(1),
(2) Date: Sep. 26, 2014

(87) PCT Pub. No.: WO2013/143770
PCT Pub. Date: Oct. 3, 2013

(65) Prior Publication Data
US 2015/0116875 A1 Apr. 30, 2015

(30) Foreign Application Priority Data
Mar. 27, 2012 (DE) .................. 10 2012 204 862

(51) Int. Cl.
*H02H 7/22* (2006.01)
*B60L 3/04* (2006.01)
(Continued)

(52) U.S. Cl.
CPC ............ *H02H 7/22* (2013.01); *B60L 3/0046* (2013.01); *B60L 3/04* (2013.01); *B60L 11/1809* (2013.01);
(Continued)

(58) Field of Classification Search
CPC .. H02H 7/22; B60L 3/04; H02J 7/0031; H02J 7/0063; B06L 11/1809; B06L 3/0046; Y02T 90/14; Y02T 10/7005
(Continued)

(56) References Cited

U.S. PATENT DOCUMENTS 5,847,655 A * 12/1998 Nourrcier ............ H03K 17/96
307/140
7,084,361 B1 8/2006 Bowes et al.
(Continued)

FOREIGN PATENT DOCUMENTS

CN 2098039 3/1992
CN 101454172 6/2009
(Continued)

OTHER PUBLICATIONS

EP 2405565, Hitachi Automotive Systems; Jan. 11, 2012.*
(Continued)

*Primary Examiner* — Dharti Patel
(74) *Attorney, Agent, or Firm* — Michael Best & Friedrich LLP

(57) ABSTRACT

The invention relates to a safety device for a high-voltage system, having a coupling device which switchably couples high-voltage components of the high-voltage system to external components, and which is designed to electrically separate the high-voltage components from the external components depending on actuation of a safety switch, having a discharge circuit which is designed to electrically discharge the high-voltage components depending on actua- (Continued)

tion of the safety switch, and having a monitoring device which is designed to monitor electric parameters of the discharge circuit or of the high-voltage components, and to release the lock of a housing for the high-voltage components if at least one of the electric parameters of the discharge circuit or of the high-voltage components falls below a predetermined threshold value.

12 Claims, 1 Drawing Sheet

(51) Int. Cl.
*B60L 3/00* (2006.01)
*B60L 11/18* (2006.01)
*H02J 7/00* (2006.01)

(52) U.S. Cl.
CPC .......... *H02J 7/0031* (2013.01); *H02J 7/0063* (2013.01); *Y02T 10/7005* (2013.01); *Y02T 10/7072* (2013.01); *Y02T 90/14* (2013.01)

(58) Field of Classification Search
USPC .......................................................... 361/87
See application file for complete search history.

(56) References Cited

U.S. PATENT DOCUMENTS

| | | |
|---|---|---|
| 7,402,068 B1 | 7/2008 | Tarchinski |
| 7,530,850 B2 | 5/2009 | Maguire et al. |
| 7,679,211 B2 | 3/2010 | Tabatowski-Bush et al. |
| 2004/0017643 A1 | 1/2004 | Hartling et al. |
| 2007/0235313 A1 | 10/2007 | Maguire et al. |
| 2008/0081516 A1 | 4/2008 | Brandt et al. |
| 2008/0297303 A1 | 12/2008 | Tabatowski-Bush et al. |
| 2009/0268354 A1* | 10/2009 | Kaplan ................. B60L 3/0023 361/15 |

FOREIGN PATENT DOCUMENTS

| | | |
|---|---|---|
| CN | 201398028 | 2/2010 |
| CN | 102082303 | 6/2011 |
| EP | 2405565 | 1/2012 |
| JP | 5888964 | 5/1983 |
| JP | S5888964 | 5/1983 |

OTHER PUBLICATIONS

JP S5888964; Ricoh KK; May 27, 1983.*
International Search Report for Application No. PCT/EP2013/052982 dated Apr. 11, 2014 (English Translation, 2 pages).

* cited by examiner

SAFETY DEVICE FOR A HIGH-VOLTAGE SYSTEM AND METHOD FOR SAFEGUARDING A HIGH-VOLTAGE SYSTEM

BACKGROUND OF THE INVENTION

The invention relates to a safety device for a high-voltage system and a method for safeguarding a high-voltage system, in particular for a high-voltage battery of an electrical drive system.

It appears that electronic systems which combine new energy storing technologies with electrical drive technology will increasingly be used in the future in stationary applications, such as, for example, wind turbines or solar plants, as well as in motor vehicles, such as hybrid or electric vehicles.

Electrical drive systems, for example, in electrically driven vehicles such as hybrid vehicles, electric cars, fuel cell vehicles or vehicles with Range Extender have components for energy storage and energy conversion which operate with electrical high voltages. Electrical high voltages are in this case voltages of more than 60 volts which can be potentially live threatening for humans. For that reason, an electrical insulation of said high-voltage components with respect to the vehicle, the passengers and possibly further persons involved with the motor vehicle is necessary.

It must be ensured for the inspection, servicing and repair of high-voltage components that firstly unauthorized persons are prevented access to the high-voltage components and secondly that no danger can occur to persons working on the high-voltage components. The first boundary condition is met for the most part by so-called "service disconnect" devices, with the aid of which access to the high-voltage components is only possible with the use of a special tool. The American patent publications US 2007/0235313 A1 and US 2008/0297303 A1 disclose examples for such service disconnect devices.

Additional measures are required in order to furthermore ensure that high voltage is no longer being applied to the high-voltage components when said components are being externally accessed. In the case of known measures, such as, for example, those disclosed in the American patent publications U.S. Pat. No. 7,402,068 B1, U.S. Pat. No. 7,530,850 B2 or U.S. Pat. No. 7,084,361 B1, access to the high-voltage components is made more difficult by means of suitable mechanical measures in order to provide a sufficient amount of time after a deactivation of the high-voltage system for the high-voltage components to be discharged. In other solutions, such as, for example, that described in the American patent publication U.S. Pat. No. 7,679,211 B2, a possibly present high voltage is redirected across a resistor in the service disconnect device.

The American patent publication US 2004/0017643 A1 further discloses a locking system for a cabinet comprising components for carrying electrical current, wherein the cabinet is only then unlocked if the voltage at the components lies below a threshold value.

SUMMARY OF THE INVENTION

According to one embodiment, the present invention relates to a safety device for a high-voltage system, having a coupling device which switchably couples high-voltage components of the high-voltage system to external components and which is designed to electrically separate the high-voltage components from the external components depending on actuation of a safety switch, having a discharge circuit which is designed to electrically discharge the high-voltage components depending on actuation of the safety switch, and having a monitoring device which is designed to monitor electric parameters of the discharge circuit or of the high-voltage components, and to release the lock of a housing for the high-voltage components if at least one of the electric parameters of the discharge circuit or of the high-voltage components falls below a predetermined threshold value.

According to a further embodiment, the present invention relates to a high-voltage system comprising at least one high-voltage component, a housing which protects the at least one high-voltage component from being accessed from the outside, an inventive safety device, a locking mechanism which closes the housing in a lockable manner, a safety switch which is coupled to the coupling device and the discharge circuit and an actuating device which is coupled to the locking mechanism and the safety switch and which is designed to be actuated for unlocking the housing.

According to a further embodiment, the present invention relates to a method for safeguarding a high-voltage system, in particular in an electrical drive system of an electrically operated vehicle, comprising the steps of electrically separating the high-voltage components of the high-voltage system from external components depending on actuation of a safety switch, of electrically discharging the high-voltage components via a discharge circuit depending on actuation of the safety switch, of monitoring electric parameters of the discharge circuit or of the high-voltage components, and of releasing the lock of a housing for the high-voltage components if at least one of the electric parameters of the discharge circuit of the high-voltage components falls below a predetermined threshold value.

A concept of the present invention is to block the opening of a safety housing of a high-voltage system from the inside until the voltage which is applied to the high-voltage components of the high-voltage system or, respectively, a current flow which flows through the high-voltage components of the high-voltage system has sunk below a limit value that is critical for persons working on said components. To this end, the relevant electric parameters are monitored in accordance with an unlocking signal and the lock of the housing is released only when the critical safety limit values have been undershot. To this end, the high-voltage components of the high-voltage system are actively discharged upon receiving an unlocking signal, and the status of the high-voltage components is continually monitored during the discharging process.

One of the advantages of the safety device according to the invention is that a reliable access protection to the high-voltage components of the high-voltage system can be implemented. Hence, the danger of persons involved with the high-voltage system being exposed to high-voltage can be kept to a minimum. Additional voltage tests on the high-voltage system therefore do not have to be provided.

A further advantage is that onerous, additional mounting or dismounting procedures of the housing can be omitted by the automatic testing of the electric parameters, and therefore the time taken to access the high-voltage components, for example during maintenance or repair, can be kept to a minimum.

The safety device can be particularly advantageously used in high-voltage systems comprising fuel cells because the risk of voltages produced by gas diffusion processes can exist there under certain circumstances even if the high-voltage system has already actually been switched off. The monitoring of the housing thus also offers in this case an additional protection against high voltages 000.

According to one embodiment of the safety device according to the invention, the monitoring device can comprise an electromagnetic, thermal or electronic voltage relay.

According to a further embodiment of the safety device according to the invention, the monitoring device can comprise a bimetallic switching element.

According to a further embodiment of the safety device according to the invention, the electric parameters of the discharge circuit can comprise a current flow through the discharge circuit or a voltage applied across the discharge circuit.

According to a further embodiment of the safety device according to the invention, the discharge circuit can comprise a series circuit consisting of a switch and a discharge-resistor.

According to one embodiment of the invention of the system according to the invention, the actuating device can comprise a service disconnect switch which can be actuated with a maintenance key.

According to a further embodiment of the system according to the invention, the service disconnect switch can actuate the safety switch in a first switching state and the locking mechanism for unlocking the housing in a second switching state.

According to a further embodiment of the system according to the invention, the monitoring device can be designed to prevent the service disconnect switch from being switched into the second switching state so long as at least one of the electric parameters of the discharge circuit does not fall below the predetermined threshold value.

According to one embodiment of the method according to the invention, the electric parameters of the discharge circuit can comprise a current flow through the discharge circuit or a voltage applied across the discharge circuit.

According to one embodiment of the present invention, a high-voltage system according to the invention can be provided in an electrical drive system of an electrically driven vehicle, wherein at least one of the high-voltage components comprises a traction battery of the electrically driven vehicle.

Further features and advantages of embodiments of the invention ensue from the following detailed description with reference to the attached drawings.

DETAILED DESCRIPTION

High-voltage systems in the sense of the present invention are systems or arrangements that are equipped with components or devices which operate with high electrical voltages or current flows and to which correspondingly high electrical voltages can be at least temporarily applied. In this context, high voltages can be voltage values which can be potentially dangerous to the health of humans, for example voltages of more than 60 volts.

High voltage systems can thereby be used, in particular, in electrical drive systems of electrically operated vehicles, such as, for example, hybrid vehicles, electric cars, fuel cell vehicles or vehicles with Range Extender. These high-voltage systems can be subjected to access by humans, for example, when the electrically driven vehicle is being serviced, inspected or repaired.

Figure 1:
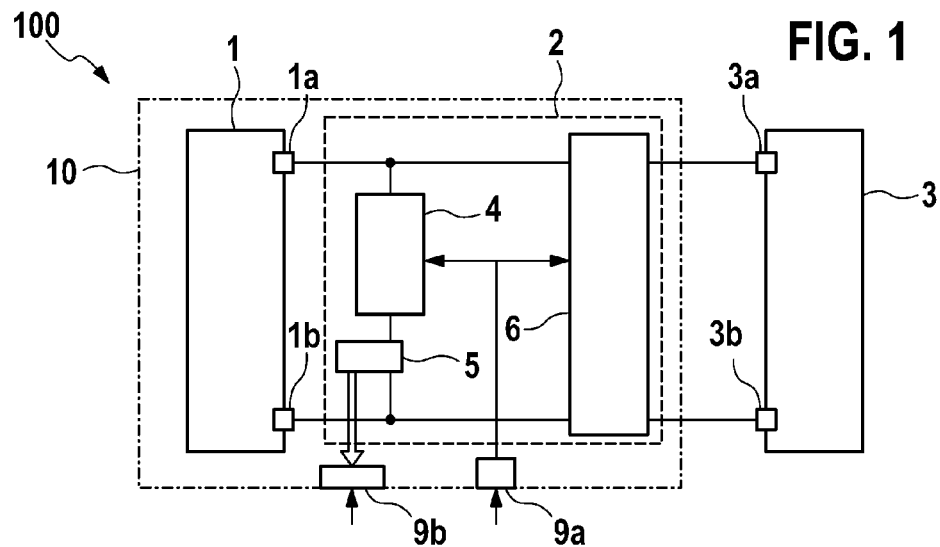
FIG. 1 shows a schematic depiction of a system comprising high-voltage components and a safety device according to one embodiment of the present invention.

FIG. 1 shows a schematic depiction of a high-voltage system 100 comprising high-voltage components 1 and a safety device 2. The high-voltage components 1 are depicted by way of example as a part having output terminals 1a and 1b, wherein a plurality of coupled high-voltage components 1 is also possible. High-voltage components 1 in the sense of the present invention are parts which operate with high electrical voltages or current flows or to which correspondingly high electrical voltages can at least temporarily be applied. High-voltage components 1 can, for example, comprise traction batteries, energy storage cells, accumulators, voltage transformers, inverters or similar components.

The high-voltage components 1 are protected against external access by a housing 10. The housing 10 can, for example, comprise a protective covering, an encapsulation, a wall or other elements which can be opened and resealed and which provide an electrical insulation of the high-voltage components 1 with respect to the ambient environment. The housing 10 can thereby comprise one or a plurality of locking elements 9b which can selectively prevent or facilitate a functional opening of the housing 10 depending on the locking status of the locking elements 9b. Only one locking element 9b is shown by way of example in FIG. 1, wherein the arrangement and number of the locking elements 9b can, in principle, be freely varied.

The high-voltage components 1 can be coupled via high-voltage cables to input terminals 3a, 3b of further components 3 of the total system. The further components 3 can, for example, be external components, such as, for example, a low-voltage on-board electrical system. The further components 3 are generally components which do not carry any voltages having voltage values that are potentially hazardous to the health of humans. The safety device 2 comprises a coupling device 6 which can switchably couple the high-voltage components 1 of the high-voltage system 100 to the external components 3. The coupling device 6 can be designed to electrically separate the high-voltage components 1 from the external components 3. This can, for example, occur in dependence on the actuation of a safety switch 9a which is connected to the safety device 2.

Actuating the safety switch 9a can also involve actuating a discharge circuit 4 in addition to the coupling device 6, said discharge circuit being coupled between the high-voltage cables of the high-voltage components 1. The discharge circuit 4 is designed to electrically discharge the high-voltage components 1. The safety device 2 further comprises a monitoring device 5 which is designed to monitor electric parameters of the discharge circuit 4 or of the high-voltage components 1. The electric parameters can, for example, comprise a voltage dropping across the discharge circuit 4 or a current flowing through said discharge circuit. Certain or all of the high-voltage components 1 can alternatively or additionally be equipped with corresponding monitoring devices. If at least one of the electrical parameters falls below a predetermined threshold value, the monitoring device 5 can be designed to release the lock of the housing 10 for the high-voltage components 1. If a plurality of electrical parameters is monitored, a release of the lock of the housing 10 can only then occur if a predetermined number of conditions are simultaneously met. To this end, the monitoring device 5 can, for example, actuate the locking elements 9b. The actuation of the locking elements 9b can, for example, take place electrically or mechanically. The monitoring device 5 can, for example, comprise an electromagnetic, thermal or electronic voltage relay. A possibility for a thermal voltage relay can thereby be a bimetallic switching element, as is used in motor circuit-breakers or mechanical gate locks for household appliances such as, for example, washing machines or dryers.

Figure 2:
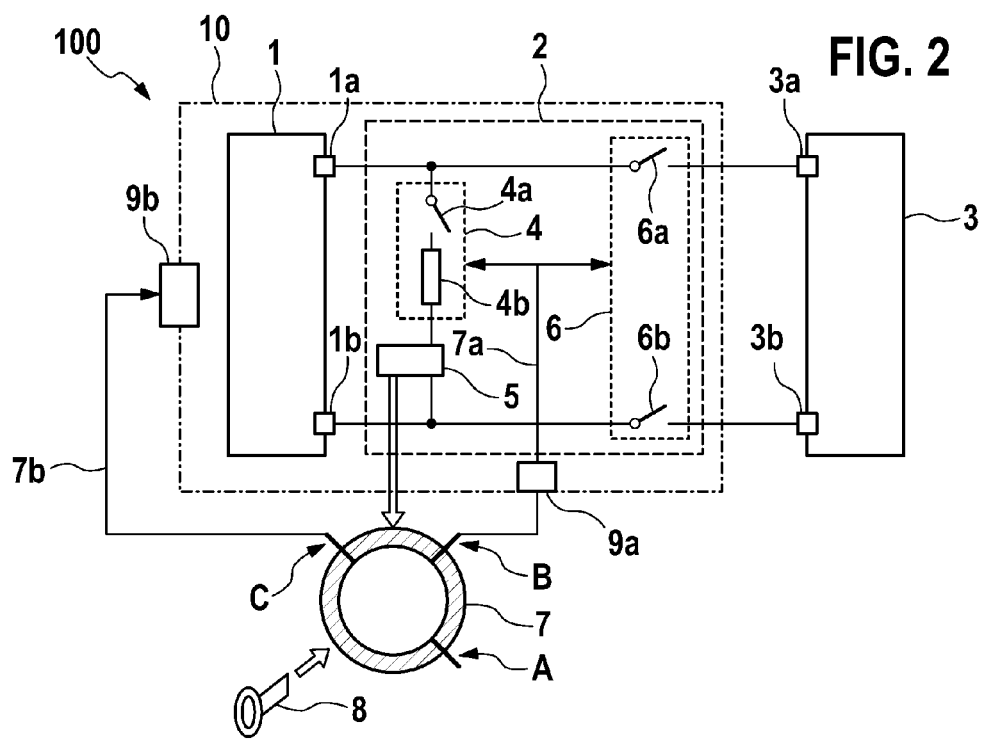
FIG. 2 shows a schematic depiction of a system comprising high-voltage components and a safety device according to a further embodiment of the present invention.

FIG. 2 shows a schematic depiction of a high-voltage system 100 comprising high-voltage components 1 and a safety device 2 in greater detail. The locking elements 9b and the safety switch 9a can thereby be coupled to an actuating device 7 and be actuated by the same to unlock the housing 10. The actuating device 7 has a service disconnect switch 7 or maintenance switch which can be actuated with a maintenance key. In an operational switching state A, the high-voltage system 100 is thereby in operation. If the service disconnect switch 7 is brought into a first switching state B using the maintenance switch 8, the safety switch is thereby electrically or mechanically actuated. This triggers via a safety signal 7a a separation of the high-voltage components 1 from the external components 3 by the isolation contactors 6a, 6b of the coupling device 6 being opened.

In addition, the discharge circuit 4 can either be activated as a function of the safety signal 7a or automatically upon detection of an open state of the isolation contactors 6a, 6b of the coupling device 6. The discharge circuit 4 in FIG. 2 comprises, by way of example, a series circuit consisting of a switch 4a and a discharge-resistor 4b. The high-voltage components 1 are thereby discharged by the switch 1 being closed and by residual voltage at the high-voltage components 1 being converted to waste heat.

The monitoring device 5 can thereby monitor the current flow or the voltage in the discharge circuit 4. As long as at least one of the electric parameters monitored by the monitoring device 5 has not yet fallen below a predetermined limit value or threshold value, the monitoring device 5 prevents, by means of a mechanical lock, the service disconnect switch 7 from being brought from the first switching state B into a second switching state C. Only if, for example, the voltage in the discharge circuit 4 falls below the predetermined threshold value, for example 60 volts, does the monitoring device 5 mechanically release the service disconnect switch 7.

The second switching state C thereby serves to actuate the locking elements 9b or the locking mechanism 9b to unlock the housing 10. The monitoring device 5 is therefore designed to prevent the service disconnect switch 7 from being switched into the second switching state C as long as at least one of the electric parameters has not fallen below the predetermined threshold value.

A possible enhancement of the high-voltage system 100 would be to dispose a visual or auditory display device (not depicted) on the housing 10 or on the actuating device 7. Said display device would indicate to a user of the high-voltage system, for example maintenance personnel, whether the high-voltage components 1 have already been discharged or not. In the simplest case, the display device could, for example, be a glow lamp or LED which lights up as long as the voltage is still too high. Other display devices as acoustic warning signal devices or measurement displays are likewise conceivable.

In order to increase the safety of the high-voltage system 100, an electrical connection of all high-voltage components 1 to a ground, for example the vehicle mass, can also be established in the switching state C. This would bring about a potential equalization with respect to the vehicle and further reduce the potential danger for the user.

Figure 3:
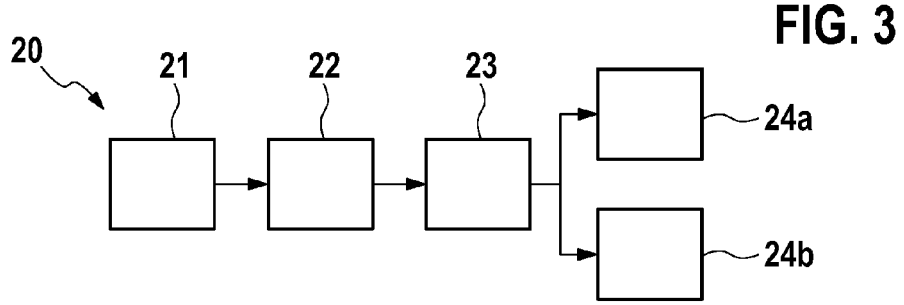
FIG. 3 shows a schematic depiction of a method for safeguarding access to high-voltage components according to a further embodiment of the present invention.

FIG. 3 shows a schematic depiction of a method 20 for safeguarding a high-voltage system, in particular in a drive system of an electrically operated vehicle. The method 20 can, for example, be used for operating a high-voltage system 100 as is shown in FIGS. 1 and 2. In a first step 21, high-voltage components 1 of the high-voltage system 100 are electrically separated from external components 3 depending on actuation of a safety switch 9a. In a second step 22, the high-voltage components 1 are electrically discharged 22 via a discharge circuit 4 depending on actuation of the safety switch 9a. In a third step 23, electric parameters of the discharge circuit 4 or of the high-voltage components 1 are monitored 23, said parameters being, for example, a current flow through the discharge circuit 4 or a voltage applied across the discharge circuit 4.

As long as one or a plurality of the electric parameters of the discharge circuit 4 or of the high-voltage components 1 has not yet fallen below a predetermined threshold value, the lock of the housing 10 in step 24a is still not released. Only if one or a plurality of the electric parameters of the discharge circuit 4 or of the high-voltage components 1 falls below a predetermined threshold value, does a release of the lock of the housing 10 of the high-voltage components 1 occur in step 24b.

The invention claimed is:

1. A safety device (2) for a high-voltage system (100), having:
    a coupling device (6) which switchably couples high-voltage components (1) of the high-voltage system (100) to external components (3) and which is configured to electrically separate the high-voltage components (1) from the external components (3) depending on actuation of a safety switch (9a);
    a discharge circuit (4) which is configured to electrically discharge the high-voltage components (1) depending on actuation of the safety switch (9a); and
    a monitoring device (5) which is configured to monitor electric parameters of the discharge circuit (4) or of the high-voltage components (1) and to release a lock of a housing (10) for the high-voltage components (1) if at least one of the electric parameters of the discharge circuit (4) or of the high-voltage components (1) falls below a predetermined threshold value.

2. The safety device (2) according to claim 1, wherein the monitoring device (5) comprises an electromagnetic, thermal or electronic voltage relay.

3. The safety device (2) according to claim 2, wherein the monitoring device (5) comprises a bimetallic switching element.

4. The safety device (2) according to claim 1, wherein the electric parameters of the discharge circuit (4) comprise a current flow through the discharge circuit (4) or a voltage applied across the discharge circuit (4).

5. The safety device (2) according to claim 1, wherein the discharge circuit (4) comprises a series circuit consisting of a switch (4a) and a discharge-resistor (4b).

6. A high-voltage system (100), having:
    at least one high voltage component (1);
    a housing (10) which protects the at least one high-voltage component (1) from external access;
    a safety device (2) according to claim 1;

a locking mechanism (9b) which closes the housing (10) in a lockable manner;

a safety switch (9a) which is coupled to the coupling device (6) and to the discharge circuit (4); and an actuating device (7) which is coupled to the locking mechanism (9b) and to the safety switch (9a) and which is configured to be actuated for unlocking the housing (10).

7. The high-voltage system (100) according to claim 6, wherein the actuating device (7) has a service disconnect switch which is configured to be actuated with a maintenance key (8).

8. The high-voltage system (100) according to claim 7, wherein the service disconnect switch (7) actuates the safety switch (9a) in a first switching state (B) and actuates the locking mechanism (9b) for unlocking the housing (10) in a second switching state (C).

9. The high-voltage system (100) according to claim 8, wherein the monitoring device (5) is configured to prevent the service disconnect switch (7) from being switched into the second switching state (C) as long as at least one of the electric parameters of the discharge circuit (4) has not fallen below the predetermined threshold value.

10. A electrical drive system for an electrically driven vehicle, comprising a high-voltage system (100) according to claim 6, wherein the at least one high-voltage component (1) comprises a traction battery of the electrically driven vehicle.

11. A method (20) for safeguarding a high-voltage system (100), comprising the steps:

electrically separating (21) high-voltage components (1) of the high-voltage system (100) from external components (3) depending on actuation of a safety switch (9a);

electrically discharging (22) the high-voltage components (1) via a discharge circuit (4) depending on actuation of the safety switch (9a);

monitoring (23) electric parameters of the discharge circuit (4) or of the high-voltage components (1); and releasing (24b) a lock of a housing (10) for the high-voltage components (1) if at least one of the electric parameters of the discharge circuit (4) or of the high-voltage components (1) falls below a predetermined threshold value.

12. The method (20) according to claim 11, wherein the electric parameters of the discharge circuit (4) comprise a current flow through the discharge circuit (4) or a voltage applied across the discharge circuit (4).

* * * * *